United States Patent Office 3,249,412
Patented May 3, 1966

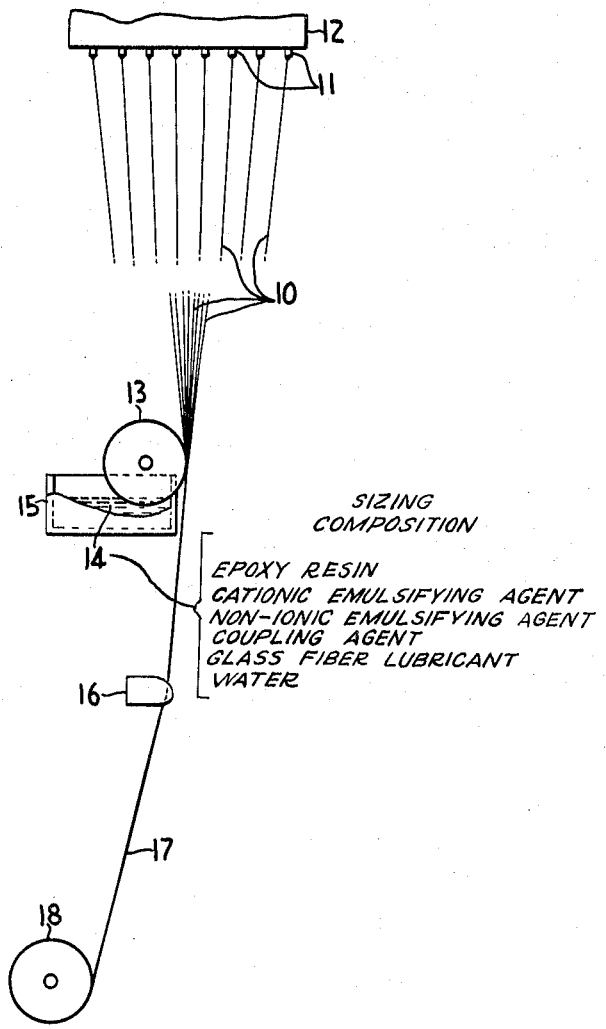

3,249,412
METHOD OF SIZING GLASS FIBERS AND EPOXY RESIN EMULSION THEREFOR
Robert L. Kolek, Shaler Township, and George E. Eilerman, Ross Township, Pa., assignors to Pittsburgh Plate Glass Company, Pittsburgh, Pa., a corporation of Pennsylvania
Filed Mar. 21, 1963, Ser. No. 266,837
8 Claims. (Cl. 65—3)

The present invention relates to stable emulsions of epoxy resins and to the use of such emulsions for glass fiber treatment. More particularly, this invention relates to a novel size composition for treating glass fibers which may be used as reinforcement for resins.

A glass fiber strand is composed of a multitude of fine glass filaments which are formed by being drawn at a high rate of speed from molten cones of glass located at the tips of small orifices and a bushing such as shown in U.S. Patent No. 2,133,238. During formation, the filaments are coated while moving at a speed of the order of 5,000 to 20,000 feet per minute with a size which contains a binder to give the strand integrity or workability for any standard textile or reinforcement use. If the strand does not have proper integrity, fuzzing occurs during these operations and eventually the strand breaks. The size also contains a lubricant for the filaments to prevent destruction of the strand by abrasion of the individual filaments against each other or against fiber handling equipment.

It is common practice to use glass fiber strands in many forms as a reinforcement for resins. For such use, the glass fibers are coated with a coupling agent or finishing material which makes the surface of the glass fibers substantive and compatible with the particular resins with which they are to be employed. These coupling agents greatly increase the dry and wet flexural strength of the glass fiber resin laminate.

When the glass fibers are used in the form of strand, i.e., roving or chopped strand or twisted strand, for resin reinforcement, the coupling agent is usually combined with the size and applied with the size to the fibers during their formation. The size employed is usually an aqueous dispersion of a film forming, synthetic resin. Roving is formed by combining a number of strands in parallel form and winding the strands on a tubular support in a manner such that the combined strands may be unwound and used to form woven roving or chopped strands. Twisted strand (single end on a bobbin) is made according to conventional textile twisting techniques by removing the strand from the forming package and winding it on a twister bobbin. It is therefore necessary that the strand have good integrity and resistance to fuzzing during the steps employed to make the twisted strand or roving and fabricate them into form suitable for use as a resin reinforcement.

In formulating sizes which are to be used in the treatment of glass fibers, it is common practice to employ a lubricant. The glass fiber lubricants which are used in the treatment of glass fibers during their formation are generally cationic materials.

In the application of a size composition to glass fibers during their formation, the size composition is generally applied in the form of an aqueous emulsion as a thin film to the surfaces of the individual filaments immediately after they have been formed. These aqueous emulsions are applied by means of a roller applicator or some other suitable device. In the applicator, the size composition is subjected to very high shear forces which have a tendency to break the emulsion. If the emulsion breaks during the application of the size to the glass filaments, a gummy residue is formed which may clog the apparatus. It is then necessary to halt the operation in order to clean the apparatus and replace the size composition with a fresh emulsion. Therefore, it is necessary that the emulsion which is used for sizing glass fibers be highly stable. Heretofore, no aqueous emulsions of epoxy resins have been known which remain consistently stable when used in a sizing composition for application to glass fibers.

It is an object of this invention to provide highly stable aqueous emulsions of epoxy resins. It is another object of this invention to provide a size for application to glass strands during their formation, which size contains a stable emulsion of an epoxy resin.

An additional object of this invention is to provide glass fiber roving which has been treated with a size with good "wet-out" properties. It is desirable in the formation of glass fiber laminates that the resin completely impregnate the strand and wet the surfaces of the fibers as quickly as possible in order to reduce the time required to make the laminates as well as to provide a laminate with maximum possible strength.

It is yet another object of this invention to provide a glass fiber strand which is treated with a size and which can be twisted, plied and woven into cloth for use with a resin reinforcement without requiring heat cleaning and finishing of the cloth prior to such use as may now be required.

These, and other objects, are accomplished by the practice of this invention which, briefly, comprises providing a stable aqueous emulsion of an epoxy resin, said emulsion containing about 5 to about 15 percent by weight of the epoxy resin of a cationic emulsifying agent selected from the group consisting of imidazolines having the formula

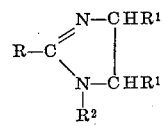

and amides having the formula

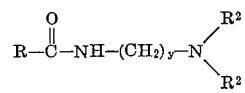

wherein R is an aliphatic hydrocarbon radical containing from 4 to 22 carbon atoms, each $R^1$ is a member selected from the group consisting of hydrogen, hydroxyl and lower alkyl, $R^2$ is a member selected from the group consisting of hydrogen, lower alkyl and radicals having the formula $(CH_2)_xOH$ in which $x$ is an integer from 2 to 6, and $y$ is an integer from 1 to 6; and from about 5 to 15 percent by weight of the epoxy resin of a nonionic emulsifying agent having the formula

wherein Y is a member selected from the group consisting of hydrogen and $-(CH_2)_zCH_3$ in which $z$ is a whole integer from 7 to 11, each $R^3$, $R^4$ and $R^5$ is a member selected from the group consisting of hydrogen and $-CH_3$, and $a$, $b$ and $c$ are integers, the total value of the integers $a$, $b$ and $c$ being such that the molecular weight of said non-ionic emulsifying agent is from about 3,000 to about 20,000.

In the above formulas which define the cationic emulsifying agent, the radical R may be a saturated or unsaturated aliphatic hydrocarbon radical derived from a fatty acid such, as for example, caproyl, octanyl, decanyl, lauryl, palmityl, stearyl, oleyl, linoleyl, linolenyl, etc. The $R^1$ groups may be, for example, methyl, ethyl, propyl, hexyl, etc., as well as hydrogen and hydroxyl. Each $R^2$ group may be, for example, methyl, ethyl, butyl, hexyl, 2-hydroxyethyl, 4-hydroxybutyl, 5-hydroxypentyl and 6-hydroxyhexyl.

The imidazolines which may be used in the practice of this invention may be obtained by dehydrating fatty acid amides of ethylene diamine or its N-substituted products, i.e., by heating ethylene diamine or one of its N-substituted products, such as 2-hydroxyethyl ethylene diamine, 2-hydroxyisopropyl ethylene diamine, etc., with free fatty acids, such as lauric, palmitic, oleic, linoleic, ricinoleic, stearic, etc., or the corresponding amides or esters, under such conditions as to effect the splitting out of water. Such compounds and their preparation are described in detail in U.S. Patents 2,200,815; 2,267,965 and 2,268,273, the disclosures of which are incorporated herein by reference. Some commercially available imidazolines which may be utilized include Amine O which has the formula

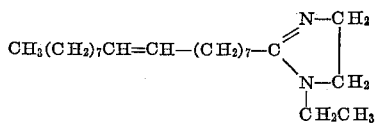

and Nalcamine G—13 which has the formula

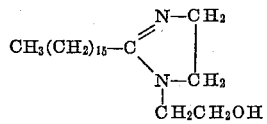

This compound is also known as Amine 220.

The amides which may be employed may be produced by the conventional reaction of a fatty acid, such as lauric, oleic, linoleic, ricinoleic, stearic and palmitic acids, as well as their salts and esters, with an alkylene diamine or substituted derivative thereof, such as ethylene diamine, propylene diamine, butylene diamine, N-methyl ethylene diamine, N-propyl ethylene diamine, hydroxy ethyl ethylene diamine, etc. One commercially available amide which may be used is Sapamine A which has the formula

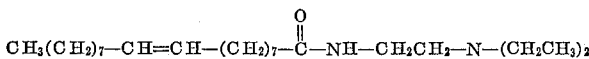

Referring more particularly to the non-ionic emulsifying agent defined above, it will be apparent from the formula representing this class of compounds that this compound is a polyoxyalkylene glycol or monoether thereof. Thus, the non-ionic emulsifying agent is a polyoxyethylene glycol when $R^3$, $R^4$, $R^5$ and Y are all hydrogen. If $R^3$, $R^4$ and $R^5$ are all—$CH_3$ groups and Y is hydrogen, the compound is a polyoxypropylene glycol. If $R^3$, $R^4$ and $R^5$ are all hydrogen and Y is a lauryl group (i.e., —$C_{12}H_{25}$), the compound is a polyoxyethylene glycol monoether of lauryl alcohol. Such a compound is sold under the trade name of Brij-35.

When $R^3$, $R^5$, and Y are all hydrogen and $R^4$ is a methyl group, the compound is a block polyoxyethylene-polyoxypropylene-polyoxyethylene glycol. Compounds of this type are block polymers and are prepared by condensing ethylene oxide with a hydrophobic base formed by the condensation of propylene oxide with propylene glycol as is described in detail in U.S. Patent 2,674,619, the disclosure of which is incorporated herein by reference. Such compounds are sold under the trade name of Pluronics. Pluronic P-105, for example, is a paste which has an average molecular weight of 6,500. Pluronic F-108 is a solid which has a melting point of 62° C. and an average molecular weight of 16,300.

The epoxy resins which may be employed in the emulsions of this invention are well known in the art. They are compounds which contain at least one group in which an oxygen atom is attached to adjacent carbon atoms— i.e., the group

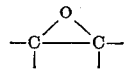

One group of epoxy resins is obtained by the reaction of an epihalohydrin such as epichlorohydrin with a polyhydric phenol such as bis-(4-hydroxy phenyl)-2,2-propane, bis-(hydroxy phenyl) methane (obtained by the acid condensation of 2 moles of phenol with one mole of formaldehyde), hydroquinone, resorcinol, etc., or with a polyhydroxy alcohol such as glycol, polyethylene glycol, sorbitol, glycerol, etc. Such compounds are characterized by the presence of terminal hydroxy groups. These resins are further described in U.S. Patents 2,324,483; 2,444,333; 2,494,295; 2,500,600 and 2,511,913, the disclosures of which are incorporated herein by reference. By varying the proportions of the epihalohydrin and the polyhydroxy compound, and/or by varying the reaction conditions, resins of low, intermediate or higher molecular weights may be produced which range from liquids to solids. Some commercially available resins of this type and their characteristics are listed below:

| Resin | Epoxide Equivalent | Approximate Molecular Weight | Viscosity | Melting Point, ° C. |
|---|---|---|---|---|
| Epon 812 | 140–160 | 306 | 1–2 Poises | Liquid. |
| Epon 828 | 192 | 390 | | 8–12. |
| Epon 834 | 230–280 | 470 | 4–9 Poises | 20–28. |
| Epon 1001 | 425–550 | 900 | Solid | 64–76. |
| Dow 331 | 192 | 390 | | |
| Dow 2337 | 374–415 | 800 | 200 Poises | Liquid. |

Other epoxy resins which may be used include epoxylated novolaks, epoxidized polyolefins, epoxidized polybutadiene and other epoxiized diene polymers, etc.

Preferred epoxy resins are those which have an epoxide equivalent of from about 140 to 550 and an average molecular weight of from about 300 to 900.

If the epoxy resin is a solid or a viscous liquid, it is preferred to dissolve it in an organic solvent therefor, such as xylene, in order to reduce the viscosity before forming the aqueous emulsion.

If the aqueous emulsion is to be stored for a long period of time, it is beneficial to include a hydrophilic colloidal material as a protective agent for the emulsion such as, for example, polyvinyl pyrrolidone.

The following examples illustrate the formation of epoxy resin emulsions according to the practice of this invention:

*Example I*

Ingredient:                                            Parts by weight
    Condensation product of bisphenol A and
        epichlorohydrin (Epon resin 828) _____ 100.0
    Pluronic F-108 _____ 5.0
    Geigy Amine O _____ 5.0
    Water _____ 500.0

In preparing this emulsion the epoxy resin is mixed with 10 parts by weight of xylene and warmed to about 100° F. while stirring to give a uniform, watery solution. Subsequently, the Pluronic F-108 is melted and stirred into the solution. The Geigy Amine O is then stirred into the solution and the solution is slowly poured into the water which has been warmed. During the addition of this solution to the water, the mixture is stirred vigorously to obtain the emulsion. A stable emulsion results.

Example II

| Ingredient: | Parts by weight |
|---|---|
| Condensation product of bisphenol A and epichlorohydrin (Epon resin 828) | 100.0 |
| Xylene | 20.0 |
| Brij-35 | 5.0 |
| Sapamine PA | 10.0 |
| Polyvinyl pyrrolidone | 20.0 |
| Water | 250.0 |

The Epon 828 and xylene are mixed together and warmed with stirring to 150° F. The Brij-35 is added to and mixed into the solution along with the Sapamine PA. This entire mixture is then slowly poured into 200.0 parts by weight of warm water with vigorous agitation. The polyvinyl pyrrolidone is then dissolved in 50.0 parts by weight of warm water and added to the emulsion. The resultant emulsion is very stable.

Example III

| Ingredient: | Parts by weight |
|---|---|
| Dow Epoxy Resin 331 | 100.0 |
| Xylene | 10.0 |
| Pluronic F-108 | 5.0 |
| Geigy Amine O | 5.0 |
| Acetic acid | 1.0 |
| Water | 150.0 |

The epoxy resin, Pluronic F-108 and xylene are mixed together and heated with stirring to 150° F. The Geigy Amine O is mixed with 50.0 parts by weight of warm water to which the acetic acid has been added. The Geigy Amine O solution is then slowly added with vigorous agitation to the solution of the epoxy resin and xylene. An additional 50 parts of water is then slowly added with agitation after which the formation of the emulsion is complete.

Example IV

| Ingredient: | Parts by weight |
|---|---|
| Epon 1001 | 100.0 |
| Xylene | 20.0 |
| Pluronic F-108 | 10.0 |
| Geigy Amine O | 10.0 |
| Polyvinyl pyrrolidone | 20.0 |
| Water | 250.0 |

The epoxy resin and xylene are mixed together and heated to 150° F. to give a uniform solution. The Pluronic F-108 and Geigy Amine O are added to this solution and thoroughly admixed therewith. To this resin mixture, 200.0 parts of water are slowly added while being vigorously agitated with a homogenizer. After the emulsion is formed, the polyvinyl pyrrolidone is dissolved in 50.0 parts of warm water and added to the emulsion.

When the aqueous epoxy resin emulsions of this invention are to be used to provide the resinous binder component in a size composition for treating glass fibers, they are used in conjunction with a coupling agent and a glass fiber lubricant. The aqueous sizing composition is formulated so that it contains from about 1 to 5 percent by weight of an epoxy resin binder, from about 0.3 to about 2.0 percent by weight of a coupling agent, from about 0.1 to 1 percent by weight of a glass fiber lubricant and from about 5 to about 15 percent by weight of the epoxy resin of each of the above described and cationic and non-ionic emulsifying agents.

Silane and siloxane materials may be used as coupling agents in the practice of this invention. For example, vinyl and allyl halo, alkoxy, amino, acyloxy or methacrylate silanes, their hydrolysis products and polymers of the hydrolysis products and mixtures of any of these are suitable for such use. Some of these silanes are disclosed in U.S. Patents Nos. 2,688,006; 2,688,007; 2,723,-211; 2,742,378; 2,754,237; 2,776,910 and 2,799,598, the disclosures of which are incorporated herein by reference.

Another class of coupling agents which has been found to be useful are the basic (hydroxy containing) metal salts of a strong mineral acid, such as, for example, a basic chromium chloride, basic chromium sulfate, etc. These compounds are ones having a trivalent metal ion selected from the group consisting of chromium, cobalt, nickel, copper and lead, at least one hydroxyl group attached to the metal, and at least one anion of a strong mineral acid attached to the metal (as well as coordinate complexes of these compounds and mixtures thereof).

Another type of coupling agent which may be used in the practice of this invention is a complex compound of the Werner type in which a trivalent nuclear atom, such as chromium, is coordinated with an organic acid such as methacrylic acid, i.e., a methacrylic acid complex of chromic chloride.

Mixtures of two or more of any of these coupling agents may be used.

The glass fiber lubricant for use in the present invention is a cationic-active, acid solubilized, fatty acid amide. A suitable material is manufactured by the Arnold Hoffman Company under the trade number RL-185A. It is an anhydrous material which is a deep reddish, amber, viscous liquid at room temperature. It is water dispersible and has a pH of 8.9 to 9.4 in a one percent by weight aqueous dispersion. Other commercially available acid solubilized, fatty acid amides are useful as glass fiber lubricant in the practice of the invention. These include both saturated and unsaturated fatty acid amides wherein the acid group contains from 4 to 24 carbon atoms. Also included are anhydrous, acid solubilized polymers of the lower molecular weight unsaturated fatty acid amides. The glass fiber lubricant is employed in an amount approximately 0.1 to 1 percent by weight of the sizing solution.

Another glass fiber lubricant which can be used in the size is an alkyl imidazoline derivative which includes compounds of the class $\mu$-alkyl N-amidoalkyl imidazolines which may be formed by causing fatty acids to react with polyalkylene polyamines under conditions which produce ring closure. The reaction of tetraethylene pentamine with stearic acid is exemplary of such reaction. These imidazolines are described more fully in U.S. Patent No. 2,200,815. Other suitable imidazolines are described in U.S. Patents Nos. 2,267,965; 2,268,273 and 2,355,837.

The size may contain a wetting agent although it is generally not necessary. If a wetting agent is used, it is preferably cationic or non-ionic and it may also serve as an additional lubricant. Any material which is conventionally known to be useful as such can be used. Such materials include cetyl or stearyl monoamine hydrochloride or acetate, dodecyl amine, hexadecyl amine and secondary and tertiary derivatives of the same, for example, dodecyl methyl amine and salts thereof. Alkyl quaternary ammonium compounds such as trimethyl stearyl or cetyl ammonium bromides and chlorides and generally any of the amine compounds that dissociate in water systems to provide a positive radical containing a group of more than 8 and preferably 12 or more carbon atoms may be used. Other examples of suitable wetting agents are polyoxyethylene derivatives of sorbitol fatty acid ester such as polyoxyethylene sorbitan monostearate or polyoxyethylene sorbitan trioleate. The amount of such wetting agent employed generally ranges up to about 1 percent by weight of the aqueous sizing solution.

The total solids content of the sizing solution is about 2 to 15 percent by weight of the solution. In all events the amounts of the various ingredients should not exceed that amount which will cause the viscosity of the solution to be greater than about 100 centipoises at 20° C. Solutions having a viscosity of greater than 100 centipoises at 20° C. are very difficult to apply to glass fiber strands during their formation without breaking the strand. It is preferred that the viscosity of the size be between 1 and 20 centipoises at 20° C. for best results.

The pH of the solution may vary generally from about 3 to 8.

An epoxy resin curing agent may be included in the size composition. Curing agents for epoxy resins are well known in the art. Typical curing agents include both aromatic and aliphatic primary, secondary and tertiary amines such as ethyl amine, piperidine, pyridine; polyamines such as ethylene diamine, triethylene tetramine, phenylene diamine; polycarboxylic acids and anhydrides such as succinic, maleic, phthalic, oxalic, polyadipic and polysebacic acids and anhydrides; polysulfides; polyamides; phenolic urea and melamine condensation products with an aldehyde; $BF_3$-amine complexes; low molecular weight acidic polyesters obtained by the condensation of a polycarboxylic acid with a polyhydric alcohol; etc.

The following examples illustrate the formation of a sizing composition which may be employed in the present invention:

Example V

| Ingredient: | Parts by weight |
| --- | --- |
| Epoxy emulsion prepared in Example I | 100.0 |
| Pelargonic acid amide solubilized in water with acetic acid (RL–185) | 4.5 |
| Gamma-amino-propyl triethoxysilane | 10.0 |
| Hexamethylene diamine | 10.0 |
| Acetic acid | 14.0 |
| Water | 1900.0 |

Two-hundred fifty (250) gallons of the glass fiber size may be made by dispersing the epoxy emulsion in about 80 gallons of water in a mixing tank. The glass fiber lubricant RL–185 is added to about 2 gallons of water maintained at a temperature of about 130 to 160° F. and thoroughly mixed therein. This solution is added to about 20 gallons of cold water. The gamma-amino-propyl triethoxysilane is then added to the solution of RL–185 and this solution is admixed with the aqueous epoxy emulsion. The hexamethylene diamine is dissolved in water and added to the mixture. Sufficient water is then added to make 250 gallons of sizing solution. The pH of the sizing is adjusted to 4.0–7.0 by the addition of the acetic acid.

The sizing composition is applied to the individual glass fibers during their formation in the manner illustrated in the drawing. The sizing solution is applied to the individual fibers 10 just after their emergence from orifices 11 in an electrically heated, platinum alloy bushing 12 containing molten glass. The sizing solution is applied to the filaments prior to the time they are grouped together to form a strand by means of a roller applicator 13 which is partially submerged in the sizing solution 14 contained in a reservoir 15. Such an applicator is shown in more detail in U.S. Patent No. 2,728,972. The fibers are grouped into a strand 17 by a graphite guide 16 and wound around a forming tube 18 rotating at approximately 7500 r.p.m. to produce a strand travel of approximately 12,000 to 15,000 feet per minute. Other methods of applying the size to the strand of glass fibers, such as a pad applicator, may be employed and the strand may be formed by means other than winding on the forming tube, such as by means of a pair of rotating wheel pullers which direct the strand into a suitable collecting device. The size composition is very stable, and, although subjected to high shear during application to the glass filaments, does not break.

The glass fiber strands wound on the forming tube 18 are then dried. This may be done by heating them at a temperature and for a length of time sufficient to remove substantially all of the water, for example at about 275° F. for 8 hours. This drying causes the coupling agents to fix themselves to the glass surface and to produce the degree of strand integrity and hardness required for forming the strand into a woven cloth or woven roving. The solids content of size on the strands averages about 0.5 to 2.0 percent by weight, preferably about 0.75 percent by weight.

Further examples of the sizing compositions which may be applied to glass fibers as described above are as follows:

Example VI

| Ingredient: | Parts by weight |
| --- | --- |
| Dow Epoxy Resin 331 | 100.0 |
| Xylene | 10.0 |
| Pluronic F–108 | 5.0 |
| Geigy Amine O | 5.0 |
| Polyvinyl pyrrolidone | 20.0 |
| Acetic acid | 5.0 |
| Glass fiber lubricant (pelargonic acid amide solubilized in water with acetic acid) | 5.0 |
| Gamma-amino-propyl triethoxysilane | 10.0 |

The Dow Epoxy Resin 331, Pluronic F–108 and xylene are mixed together and warmed with stirring to 150° F. The Geigy Amine O is mixed together with 50.0 parts by weight of warm water to which 1.0 part by weight of acetic acid has been added. The Geigy Amine O solution is then slowly added with vigorous agitation to the xylene solution of epoxy resin. An additional 50.0 parts by weight of water is then slowly added followed by the addition of the polyvinyl pyrrolidone dissolved in 50.0 parts by weight of warm water to form an epoxy resin emulsion. The glass fiber lubricant and the gamma-amino-propyl triethoxysilane are dispersed in 100.0 parts by weight of water followed by the addition of the remaining acetic acid (4.0 parts by weight). The epoxy resin emulsion is then added to the dispersion and sufficient water is added to bring the total weight of the thus constituted sizing composition to 2000.0 parts.

Example VII

| Ingredient: | Parts by weight |
| --- | --- |
| Epon 828 | 125.0 |
| Xylene | 12.5 |
| Pluronic F–108 | 6.2 |
| Geigy Amine O | 6.2 |
| Polyvinyl pyrrolidone | 25.0 |
| Acetic acid | 35.5 |
| Glass fiber lubricant (pelargonic acid amide solubilized in water with acetic acid) | 5.0 |
| Gamma-amino-propyl triethoxysilane | 12.5 |
| Triethylene tetramine | 12.5 |

An epoxy resin emulsion is prepared as described in Example VI. The glass fiber lubricant, the gamma-amino-propyl triethoxysilane, and the remaining acetic acid are dispersed in 1000.0 parts by weight of water. The epoxy resin emulsion is then added followed by the addition of the triethylene tetramine. Sufficient water is then added to bring the total weight of the thus constituted sizing composition to 2000.0 parts.

Example VIII

| Ingredient: | Parts by weight |
| --- | --- |
| Dow Epoxy Resin 331 | 100.0 |
| Xylene | 10.0 |
| Pluronic F–108 | 5.0 |
| Geigy Amine O | 5.0 |
| Polyvinyl pyrrolidone | 20.0 |
| Glass fiber lubricant (pelargonic acid amide solubilized in water with acetic acid) | 5.0 |
| Gamma-amino-propyl triethoxysilane | 10.0 |
| Phenylene diamine | 10.0 |
| Acetic acid | 11.0 |

An epoxy resin emulsion is prepared as described in Example VI. The glass fiber lubricant, the gamma-amino-propyl triethoxysilane and 4.0 parts by weight of acetic acid are added to 1000.0 parts by weight of water. The epoxy emulsion is then added to this mixture followed by the addition of the phenylene diamine dissolved in 50.0 parts by weight of water and 6.0 parts by weight of acetic acid. Sufficient water is then added to bring the total weight of the thus constituted sizing composition to 2000.0 parts.

*Example IX*

| Ingredient: | Parts by weight |
|---|---|
| Epon 828 | 100.0 |
| Xylene | 10.0 |
| Pluronic F-108 | 5.0 |
| Geigy Amine O | 5.0 |
| Polyvinyl pyrrolidone | 20.0 |
| Glass fiber lubricant (pelargonic acid amide solubilized in water with acetic acid) | 5.0 |
| Gamma-amino-propyl triethoxysilane | 10.0 |
| Oxalic acid | 6.0 |

The Epon 828, Pluronic F-108 and xylene are mixed together and warmed with stirring to 150° F. The Geigy Amine O is mixed with 50.0 parts by weight of warm water. The Geigy Amine O aqueous mixture is then slowly added with vigorous agitation to the xylene solution of epoxy resin. An additional 50.0 parts by weight of water is then slowly added followed by the addition of the polyvinyl pyrrolidone dissolved in 50.0 parts by weight of warm water to form an epoxy resin emulsion. The glass fiber lubricant, the gamma-amino-propyl triethoxysilane and the oxalic acid are dispersed in 1000.0 parts by weight of water. The epoxy resin emulsion is then added to this dispersion and sufficient water is added to bring the total weight of the thus constituted sizing composition to 2000.0 parts.

*Example X*

| Ingredient: | Parts by weight |
|---|---|
| Dow Epoxy Resin 331 | 100.0 |
| Xylene | 10.0 |
| Pluronic F-108 | 5.0 |
| Geigy Amine O | 5.0 |
| Polyvinyl pyrrolidone | 20.0 |
| Glass fiber lubricant (pelargonic acid amide solubilized in water with acetic acid) | 5.0 |
| Gamma-amino-propyl triethoxysilane | 10.0 |
| Versamid 140 (a polyamide resin produced by the condensation of a polycarboxylic acid with a polyamine) | 10.0 |
| Acetic acid | 7.0 |

The epoxy emulsion is prepared as described in Example VI. The glass fiber lubricant, the gamma-aminopropyl triethoxysilane and 4.0 parts by weight of the acetic acid are added and mixed with 1000.0 parts by weight of water. The epoxy resin emulsion is then added to this mixture followed by the addition of the Versamid 140 which is dispersed in 50.0 parts by weight of water. The remaining acetic acid (2.0 parts by weight) is then added and sufficient water is added to bring the total weight of thus constituted sizing composition to 2000.0 parts.

*Example XI*

The process of Example VI is repeated with the sole exception that the Dow Epoxy Resin 331 is replaced with an equivalent amount of an epoxy resin obtained by the reaction of epichlorohydrin and glycerol.

*Example XII*

The process of Example VII is repeated with the sole exception that the Epon 828 is replaced with an equal amount of an epoxylated novolac resin.

*Example XIII*

The process of Example VIII is repeated with the sole exception that the Dow Epoxy Resin 331 is replaced with an equal amount of an epoxylated polybutadiene.

The sizes of Examples VI-XIII are applied to strands in the same manner as described above with respect to the size of Example V and the treated strands are dried as described above. They may be fabricated into various textile products, such as twisted strand, cloth, chopped strand, chopped strand mat, roving and woven roving.

These products may be combined with a resin without requiring heat cleaning and finishing of the cloth or other product as is required when glass is sized with a starch-vegetable oil containing size.

Strands which have been sized as described above have excellent "wet-out" properties. "Wet-out" refers to the rate at which the impregnating resin will flow among the filaments of the reinforcing glass strands.

Epoxy resin binding agents exhibit outstanding properties of toughness, chemical inertness, flexibility and adhesion to the glass filaments and strand. Strands which are sized with the size compositions fabricated as described above provide increased flexural strengths to resins reinforced with the strands.

The invention is useful when the glass fibers are to be laminated with epoxy resins such as condensation polymers of an epihalohydrin and a polyhydroxy phenolic compound and derivatives thereof such as bis-phenol A or other epoxy resins such as those previously described. Woven roving as described above is saturated with the epoxy resin and meta phenylene diamine. The combination is cured according to conventional epoxy resin curing techniques at an elevated temperature and pressure.

The invention is also useful when the glass fibers are to be used as reinforcement for low pressure thermosetting type resins, for example, unsaturated polyester-ethylenic monomer resins such as shown in U.S. Patent No. 2,676,947 granted to Parker. These resins are interpolymers of (A) a polyester of a dihydric alcohol such as ethylene glycol, propylene glycol, 1,3-butylene glycol, diethylene glycol, dipropylene glycol and higher polymers of alkylene glycols, and an alpha, beta ethylenic, dicarboxylic acid such as maleic or fumaric acid with other dicarboxylic acids such as adipic, succinic, azelaic and phthalic acids being added, and (B) a monomer, soluble in the polyester, containing a terminal ethylenic group,

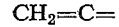

such as styrene, vinyl acetate, vinyl toluene, allyl esters including allyl acetate, allyl succinate, dichloro styrene, etc.

Although the present invention has been described with respect to specific details of certain embodiments thereof, it is not intended that such details act as limitations upon the scope of the invention. Thus, the epoxy emulsions of this invention may be used as coating compositions, etc. as well as in glass fiber sizing compositions.

We claim:

1. A stable aqueous emulsion of an epoxy resin, said emulsion containing from about 5 to about 15 percent by weight of the epoxy resin of a cationic emulsifying agent selected from the group consisting of imidazolines having the formula

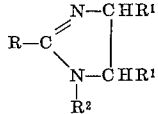

and amides having the formula

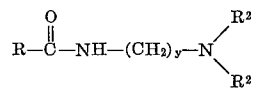

wherein R is an aliphatic hydrocarbon radical containing from 4 to 22 carbon atoms, each $R^1$ is a member selected from the group consisting of hydrogen, hydroxyl and lower alkyl, $R^2$ is a member selected from the group consisting of hydrogen, lower alkyl and radicals having the formula $-(CH_2)_xOH$ in which $x$ is an integer from 2 to 6, and $y$ is an integer from 1 to 6; and from about 5 to about 15 percent of the epoxy resin of a non-ionic emulsifying agent having the formula

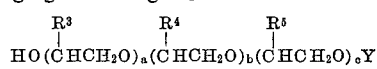

wherein Y is a member selected from the group consisting of hydrogen and $(CH_2)_zCH_3$ in which $z$ is a whole integer from 7 to 11, each $R^3$, $R^4$ and $R^5$ is a member selected from the group consisting of hydrogen and —$CH_3$, and $a$, $b$ and $c$ are integers, the total value of the integers $a$, $b$ and $c$ being such that the molecular weight of said non-ionic emulsifying agent is from about 3,000 to about 20,000.

2. An emulsion as defined in claim 1, wherein said cationic emulsifying agent has the formula

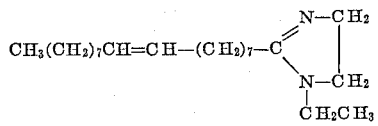

3. An emulsion as defined in claim 1 wherein said cationic emulsifying agent has the formula

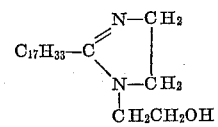

4. An emulsion as defined in claim 1 wherein said cationic emulsifying agent has the formula

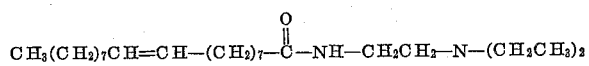

5. In the method of forming a glass fiber strand which can be fabricated and laminated with a resin which comprises drawing glass streams through orifices in a bushing to form individual glass filaments, moving the filaments away from the bushing at a high rate of speed and forming them into a strand, applying to the filaments while they are moving at this speed an aqueous sizing composition and drying the glass fibers so treated, the improvement which comprises using an aqueous sizing composition consisting essentially of from about 1 to about 5 percent by weight of said aqueous sizing composition of an epoxy resin, from about 0.3 to 2.0 percent by weight of said aqueous sizing composition of a coupling agent, from about 0.1 to 1 percent by weight of said aqueous sizing composition of a glass fiber lubricant, from about 5 to about 15 percent by weight of said epoxy resin of a cationic agent selected from the group consisting of imidazolines having the formula

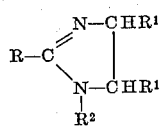

and amides having the formula

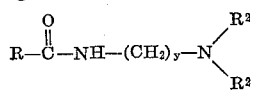

wherein R is an aliphatic hydrocarbon radical containing from 4 to 22 carbon atoms, each $R^1$ is a member selected from the group consisting of hydrogen, hydroxyl and lower alkyl, $R^2$ is a member selected from the group consisting of hydrogen, lower alkyl and radicals having the formula —$(CH_2)_xOH$ in which $x$ is an integer from 2 to 6, and $y$ is an integer from 1 to 6; and from about 5 to about 15 percent by weight of the said epoxy resin of a non-ionic emulsifying agent having the formula

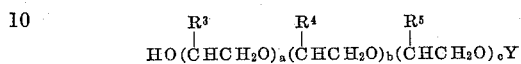

wherein Y is a member selected from the group consisting of hydrogen and $(CH_2)_zCH_3$ in which $z$ is a whole integer from 7 to 11, each $R^3$, $R^4$ and $R^5$ is a member selected from the group consisting of hydrogen and —$CH_3$, and $a$, $b$ and $c$ are integers, the total value of the integers $a$, $b$ and $c$ being such that the molecular weight of said non-ionic emulsifying agent is from about 3,000 to about 20,000; the total solid content of the solution being 2 to 15 percent by weight and the viscosity of the solution being less than 100 centipoises at 20° C.

6. A method as defined in claim 5 wherein said cationic emulsifying agent has the formula

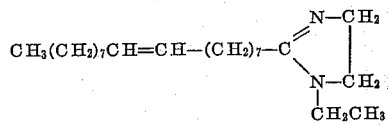

7. A method as defined in claim 5 wherein said cationic emulsifying agent has the formula

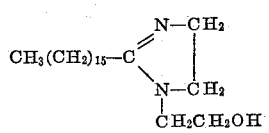

8. A method as defined in claim 5 wherein said cationic emulsifying agent has the formula

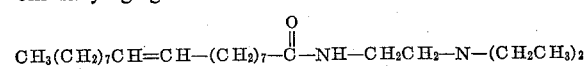

References Cited by the Examiner

UNITED STATES PATENTS

| | | | |
|---|---|---|---|
| 2,895,930 | 7/1959 | Yusem | 260—29.2 |
| 2,931,739 | 4/1960 | Marzocchi et al. | 117—126 |
| 2,951,772 | 9/1960 | Marzocchi et al. | 117—126 |
| 2,994,619 | 8/1961 | Eilerman | 117—126 |
| 3,018,267 | 1/1962 | Steckler et al. | 260—45.4 |
| 3,066,383 | 12/1962 | Marzocchi et al. | 117—126 |

DONALL H. SYLVESTER, *Primary Examiner.*

C. VAN HORN, G. R. MYERS, *Assistant Examiners.*